United States Patent [19]
Romano et al.

[11] 3,964,258

[45] June 22, 1976

[54] REDUCING UNDESIRABLE COMPONENTS OF AUTOMOTIVE EXHAUST GAS

[75] Inventors: Gaetano Romano; Bruno Gorietti, both of Rome, Italy

[73] Assignee: Exxon Research and Engineering Company, Linden, N.J.

[22] Filed: Aug. 1, 1973

[21] Appl. No.: 384,749

[52] U.S. Cl. .................................. 60/274; 60/278; 60/285; 60/284; 123/117 A; 123/119 A
[51] Int. Cl.² .......................................... F02B 75/10
[58] Field of Search ............. 60/278, 285, 284, 274; 123/117 A, 119 A

[56] References Cited
UNITED STATES PATENTS

| | | | |
|---|---|---|---|
| 1,761,513 | 6/1930 | Arthur | 123/117 A |
| 1,897,704 | 2/1933 | Mallory | 123/117 A |
| 2,809,619 | 10/1957 | Norris | 123/117 A |
| 3,631,845 | 1/1972 | Walker | 123/117 A |
| 3,636,934 | 1/1972 | Nakajima | 60/278 |
| 3,646,764 | 3/1972 | Nakajima | 60/286 |
| 3,665,904 | 5/1972 | Goodwillie | 123/117 A |
| 3,732,696 | 5/1973 | Masaki | 60/284 |
| 3,776,205 | 12/1973 | Maruoka | 60/285 |
| 3,791,144 | 2/1974 | Lang | 60/285 |

*Primary Examiner*—Douglas Hart
*Attorney, Agent, or Firm*—F. Donald Paris

[57] ABSTRACT

Undesirable pollutants in automotive exhaust gas are reduced using an emission control reactor to oxidize hydrocarbons and CO, and recirculation of some exhaust gas to the engine intake system to reduce $NO_x$ content, the warm-up time of the reactor being reduced by delaying the ignition time until the minimum working temperature of the reactor is attained, and the performance of the engine being improved by interrupting exhaust gas recycle when the engine is choked, or at idling or operating with open throttle.

8 Claims, 3 Drawing Figures

REDUCING UNDESIRABLE COMPONENTS OF AUTOMOTIVE EXHAUST GAS

The present invention relates to a method and a system for reducing atmospheric pollution from the exhaust gases of motor vehicles provided with exhaust gas purifying reactors, such as catalytic and thermal reactors. More particularly, the invention proposes for the said purpose, a method and system whose operation regulates the delay in ignition advance and regulates a recirculation of some of the exhaust gas back to the engine in particular phases of operation of the engine as described below.

The device employed is of the electro-mechanical type and it is applied to a motor vehicle equipped with a thermal reactor for achieving a rapid and balanced purification of the exhaust gases by means of the automatic control of variation in the ignition advance and the recirculation of the exhaust gases. Specifically, therefore, the invention also relates to an electromechanical device which automatically regulates, by the use of a solenoid electrovalve, the operations of varying the ignition advance and the recirculation of the exhaust gases for a quicker or more thorough purfication of the exhaust gases.

Legislation which is proposed or in force relating to atmospheric pollution sets definite limits on the content of polluting substances in the exhaust gases of motor vehicles. To meet these limits the exhaust systems of motor vehicles must be equipped with devices that effect the purification of the exhaust gases. The current laws (1972) in some European countries set definite limits only on the content of hydrocarbons and carbon monoxide in the exhaust gas. For nitrogen oxides, $NO_x$, e.g. nitric oxide, there are still no legal limitations of this kind, although provision is being made to introduce regulations in the near future on the maximum amounts of $NO_x$ emission, such as those regulations in force in the United States of America.

One device which is already used for purifying automotive exhaust gases is a catalytic or thermal reactor for promoting oxidizing in the exhaust gas.

This device nevertheless has the major drawback of reducing the concentration of hydrocarbons (HC) and carbon monoxide (CO) without displaying any action on nitric oxide (NO), whose presence in an ambient atmosphere, while exceeding certain limits, is considered to be extremely damaging to the environment, particularly to living organisms (man, plants etc).

In order to reduce the amount of $NO_x$ in the exhaust gas, it has been suggested to supplement the action of the thermal reactor by recirculating a portion of the exhaust gases to the combustion chambers of the engine.

It should now be noted that the system of purification consisting of the use of a thermal reactor with recirculation of part of the exhaust gases, while effecting a more complete purifying action, is not free from certain drawbacks. In this connection, it will be recalled by those skilled in the art that the proper working of a thermal or catalytic oxidizing reactor of the said type is ensured only when an adequately high temperature is attained and maintained, making it possible to start the oxidation reactions for the combustion of CO and HC which, once started, is self-sustaining.

The sooner this self-sustaining reaction temperature is reached in the reactor, the more efficient is the action of purifying the exhaust gas of CO and HC. The time taken for such a temperature to be established in the reactor is a function of the ignition advance, in practice, since the temperature in the combustion chamber of the engine can vary over a relatively wide range when the ignition timing is varied. To be more precise, a delay in the ignition time causes an increase in the temperature in the reactor, since under these conditions, the reaction of combustion of the air + fuel mixture tends to take place only partly in the combustion chamber and to be substantially further completed in the reactor.

The ignition advance is one of the characteristics that is prearranged in a motor vehicle by the makers and therefore in mass-produced motor vehicles there is no provision for ignition lag at the desired moment during the engine operating cycle which is suitable for establishing the rapid starting of the combustion reaction of CO and HC in the reactor, and this constitutes a considerable drawback from the point of view of obtaining a balanced and speedy purification of the exhaust gases from these components.

It should moreover be noted that by introducing this lag the performance of the engine is imparied, and that although the ignition lag is useful for rapidly attaining the temperature of self-sustaining reaction in the reactor, it is extremely detrimental if maintained when the engine has reached its working temperature, i.e. when the ignition time predetermined by the maker has to be used and for the better operation of the engine.

Furthermore, the expedient of recirculating a portion of the exhaust gas to the combustion chamber of the engine, as provided for by prior art proposals, while allowing a reduction in the $NO_x$ content of the exhaust gas, may provide no practical benefit in some phases of the operation of the engine and may indeed be disadvantageous. More especially, this recirculation is unnecessary in those phases (starting with choke, idle, deceleration, throttle fully open) during which it is not necessary to reduce emissions of $NO_x$ for various reasons that are explained below.

An object of the present invention is to provide a system for use with motor vehicles having exhaust gas oxidation reactors (e.g. thermal reactors) to promote the combustion of the CO and hydrocarbons contained in the exhaust gases and with recirculation of a portion of the said gases for reducing the $NO_x$ content which functions in such a way as to achieve correctly and rapidly the substantial elimination of the said components from the exhaust gas by automatically controlling the operations of varying the ignition time and recirculating exhaust gases in those phases of the operation of the engine in which these operations are really effective for the purpose of purification, without substantially affecting the proper running of the engine.

Another object is that of providing a motor vehicle with suitable means for substantially meeting legal provisions at present in force in Europe relating to atmospheric pollution, and including the restrictions on the emission of $NO_x$ which are at present laid down only by U.S.A. legislation.

Another object is that of providing a system which is relatively easy and economical to apply on most or all types of motor vehicle, so that a relatively thorough and rapid purification of the exhaust gases can be obtained.

In one aspect, the invention provides a method of reducing undesirable pollutants in the exhaust gas from an automotive engine provided with a pollutant control reactor in the exhaust system and means for recirculating a portion of the exhaust gas to the combustion chamber of the engine, the method comprising:

a. delaying the ignition time when the temperature of the reactor is below its minimum effective working temperature, and b. regulating the recirculation of exhaust gas according to the operating condition of the engine, the recirculation being effected only when the engine is operating with the choke off and/or when the reactor temperature is at least equal to the minimum effective working temperature.

Preferably the ignition time delay is effected pneumatically, and it is preferred that the normal ignition timing of the engine be restored in accordance with a signal which is representative or indicative of a nonidling operating condition of the engine. The said signal may be derived from one of the following operations:

i. causing a power transmission gear to engage with the engine ii. increasing the engine speed to a speed in excess of idling speed iii. moving the engine throttle plate (or throttle controls such as the accelerator pedal) from its engine idling position.

Preferably, exhaust gas is recirculated when the engine is operating at speeds in excess of idling speed but not when the engine is operating to provide maximum power or near-maximum power - e.g. when the throttle is opened for acceleration or high speed operation.

The invention also includes within its scope a system for the balanced and rapid purification of the exhaust gases in motor vehicles provided with an exhaust purification reactor, e.g. a thermal reactor, and a pipe fitted with a valve for the recirculation of part of the exhaust gases in the combustion chamber, the system comprising:

a. means for altering the ignition time which becomes operative as a direct or indirect function of the temperature in the reactor, for delaying the ignition time when the temperature is less than a predetermined working temperature of the reactor (e.g. about 850°C), and to restore the normal ignition time when the said temperature has been reached, and:

b. means for regulating the recirculation of exhaust gases, the said means coming into operation to recirculate a part of the exhaust gases in the combustion chamber when the temperature inside the reactor attains at the least the said predetermined working temperature and when the motor (engine) is running in an unchoked condition, i.e. normal fuel-air mixture for the operative state of the engine and reactor.

The said system for regulating the purification of the exhaust gases in motor vehicles, provided with thermal reactor and recirculation of the exhaust gases is preferably of the electromechanical type in which:

a. the said means for varying the ignition time act on the ignition distributor through a lever system driven by pneumatic means communicating with the intake manifold through electric valve devices, operated by a voltage tapped from a supply battery or other electrical source, conveniently through a starting switch block, via a closed circuit operating on the said valve means in the cold starting phase with the choke in the operative position; and b. the said means for controlling the recirculation of the exhaust gases in the combustion chamber comprise electric valve devices inserted between the carburetor and the recirculation pipe, operated by the voltage tapped from the said battery or other electrical source, conveniently through the said starting switch block, via a closed circuit operating on the said valve means, when the choke is in an inoperative condition, only in the acceleration phase of the throttle through two switch units which cut out its action in the slow running (or idling) phase, in the deceleration condition and with the throttle fully open, the said circuit being open with the choke in the operative condition.

In another aspect, the invention comprises a system for reducing undesirable pollutants in the exhaust gas produced by automotive engines wherein there is provided an exhaust system comprising a reactor for purifying exhaust gas produced during operation of the engine, a recirculation conduit extending from a part of the exhaust system upstream of the reactor to a part of the engine intake system, a valve for regulating the gas flow through said recirculation conduit, first means for varying the ignition timing from the normal ignition timing, said first means being directly or indirectly operative in accordance with the temperature in the reactor to retard the ignition timing when the reactor temperature is below its minimum effective working temperature and to cause or permit the restoration of the normal ignition timing when effective working temperature is reached, second means for controlling said valve and which becomes operative in accordance with the operating condition of the engine when the reactor temperature is at least equal to the minimum effective working temperature and/or when the engine choke is inoperative.

Preferably the first means comprises a conduit connected at one end to a pressure responsive member which is movable in accordance with the differential pressure thereacross and adapted for connection at the other end to the intake system of the engine whereby, during engine operation, pressure variations in said intake system ar communicable with said pressure responsive means, said pressure responsive means being connected to the ignition distributor to restrain said distributor in a spark retard position when the pressure in said conduit is reduced, a valve which normally closes said conduit, means for causing the valve to open when the operative state of the engine is between startup and a speed or power output in excess of the speed or output during idling and when the engine is not choked.

The said means for causing the valve to open preferably comprises a solenoid in series with a first switch device responsive to the operative state of the engine, and the first switch device may be connected or adapted for connection to a power transmission gearbox of, or associated with, the engine so that electrical power can be supplied to the solenoid only when a power transmitting gear of the gearbox is engaged (i.e. when the gearbox is not in a "neutral" condition). The first switch device may alternatively be connected, or adapted to be connected, for the supply of electric power, either when the throttle is in idling positions or when the engine speed is in the idling speed range.

The invention is particularly useful for automotive systems having exhaust purification reactors of the thermal type.

The invention will now be described with reference to the drawing in which.

Figure 1:
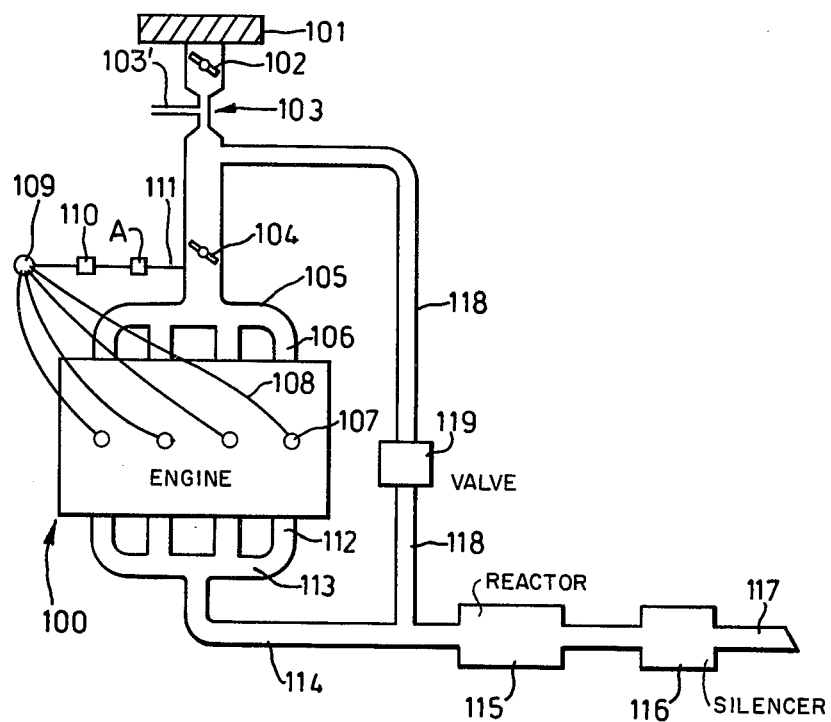
FIG. 1 is a schematic representation of an engine embodying a system in accordance with the invention.

Referring to FIG. 1, the engine is indicated by reference 100. Air is induced through air cleaner 101 and passes the choke plate 102 to the carburettor 103 whereat fuel is admixed from a fuel supply pipe 103. The air-fuel mixture passes to an intake manifold 105 at a rate determined by the setting of throttle plate 104 and is distributed to each cylinder of the engine through a respective intake pipe 106. The air-fuel mixture is ignited in the cylinder by an electric spark at a spark plug 107, the electrical pulse for this being supplied along conductor 108 from a distributor 109. The distributor 109 is of the type well known in the art and which advances the spark timing as the engine speed rises. The spark advance according to speed is modified by relaying to a pressure capsule 110 the pressure downstream of the throttle plate 104 by means of a line 111. The pressure capsule comprises a deformable diaphragm (not shown) which is connected by a link to the distributor 109 to reduce the speed-responsive spark advance time when the pressure in line 111 is reduced.

Exhaust gas is discharged via a pipe 112 to an exhaust manifold 113 connected to an exhaust pipe 114. The downstream end of the exhaust pipe 114 is connected into an exhaust gas purifying reactor 115, and exhaust gas passes from the latter to a silencer 116 and thence via a trail pipe 117 to atmosphere.

An exhaust recycle conduit 118 is connected at one end into the exhaust pipe 114 and at the other end into the engine intake duct between the carburettor 103 and the throttle plate 104, and the passage of exhaust gas through conduit 118 is controlled by valve 119.

Figure 2:
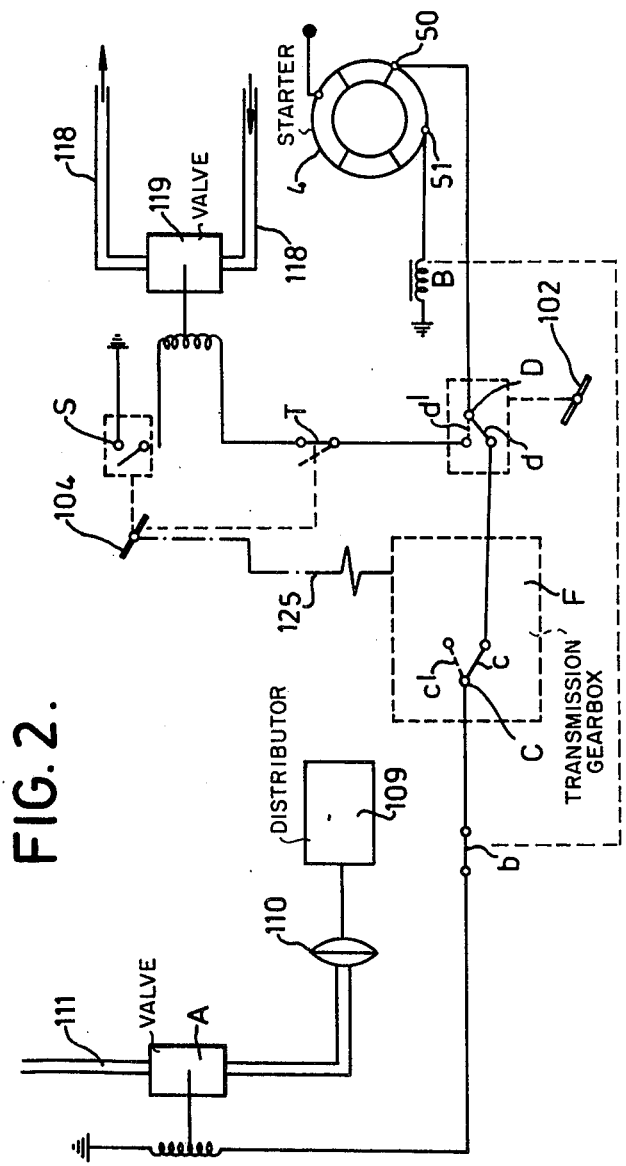
FIG. 2 is a diagram of some of the principal features of the system.

With reference now to FIG. 2 there will be seen an electrically-operated valve A of the solenoid type, inserted in line 111 between the intake duct or manifold and the pressure capsule 100 which latter is connected by a lever with the ignition distributor 109. The said solenoid valve A is activated by the supply battery voltage connected through the starter switch block 4 (ignition key inserted, position 50) along a closed circuit which is electrically complete only in the "cold starting phase", the engine running at idling speeds in neutral gear and the choke 102 being operative to enrich the fuel-air mixture through the switches C and D (switch C in position $c$ and switch D in position $d$), governed respectively by the power transmission gearbox F and connected to the engine and the choke 102. The circuit also contains a switch or contact $b$, which opens when current is passed through the relay B to the starting motor while the ignition key is in position 51, and thereby switches off the electric valve A and prevents the passage of pressure signals to the capsule 110. The circuit is also open during normal engine operation (switch C at $c'$).

While this circuit is broken, the spark timing advance of the distributor 109 will be unaffected by the intake manifold pressure and the spark timing will be governed solely by engine speed and will be retarded in comparison to the timing which would otherwise be appropriate. As a result, the proportion of fuel combustion which takes place in the cylinders is reduced and the proportion which takes place in the reactor 115 is increased thereby reducing the warm-up time of the reactor 115 and also maintaining the required working temperature of the reactor.

FIG. 2 also shows the valve 119 and its operating solenoid in recycle conduit 118.

The said valve 119 is activated by the voltage of the supply battery through the starting switch block 4 (ignition key in position 50) along a circuit which is interrupted by the switch D, when in position $d$ with choke 102 in its operative state and uninterrupted when the choke 102 is not operative, switch D then being in position $d'$.

The control circuit for valve 119 also comprises a normally open switch S and a normally closed switch T. Switch S is closed when the throttle 104 is moved from its idle position: for convenience, the switch S may be so located that closure is effected when the accelerator pedal is depressed. The switch T is opened when the throttle is fully, or almost fully, open and may be conveniently located under the accelerator pedal. It will be apparent from the foregoing description that the valve 119 is open only in throttle positions between idle and substantially fully open.

The mode of operation of the system so far described will now be explained.

It will be appreciated that for varying the ignition time, use is made of the vacuum present in the intake manifold by means of the small bellows of the pressure capsule 110 which, through a lever system, alters the position of the ignition distributor 109. The reduced pressure signal in pipe 111 is transmitted from the intake manifold to the bellows of the capsule 110, via the solenoid valve A—. The system is inactive at the moment when the starting motor is switched on through the relay B, whose contact $b$ switches off the electric valve A. In this way, the engine is started without difficulty. As soon as it is running with the gear F in neutral (switch C in position $c$) the ignition time is delayed because, there being continuity between the supply voltage tapped through the starting switch block 4 and the electric valve A, the latter opens transmitting the reduced pressure of the manifold to the small bellows of the pressure capsule 110, which in turn brings about the distributor 109. When, on the other hand the gear F is in "drive" position (switch C in position $c'$), the electrical circuit is open and therefore the electric valve A is de-excited and closes, thus causing the action of the reduced pressure of the manifold 105 on the bellows in capsule 110 to be inoperative. If the choke 102 is not operative, what has been stated above does not occur since switch D will then be in position $d'$. It should, however, be remembered that choke operation is required only when the engine is cold, and it is well known that in these circumstances the choke, both automatic and manual, must be operative.

Referring now to other parts of the system which controls the recirculation of a portion of the exhaust gases for the reduction of emissions of nitric oxide, it should be noted that the said emissions are increased by the presence of temperature peaks in the combustion chamber and an air-fuel mixture close to the stoichiometric value, as is shown by experience. To reduce the temperature peak values, a portion of the exhaust gases which acts as heat ballast is passed into the combustion chamber. When the engine is running at idle or is operating in the deceleration mode, the density of charge is so low that only small amounts of nitric oxide are formed, while in the acceleration phase the charge density is high and therefore the quantity of $NO_x$ formed is large. When, on the other hand, the engine is running with the choke 102 operative, the air-fuel mixture is so rich that the temperature in the combustion chamber is low and therefore the formation of nitric oxide is very limited. The richness of the mixture is a limiting factor, besides the low charge density, in the deceleration phase as well. When the engine is running with the throttle fully open, for instance on autobahns or other roads outside urban areas, there is no need to lessen the emissions of $NO_x$, so that the recirculation of the exhaust gases can be precluded to recover power.

The system according to the invention is able to allow the connection and interruption of the exhaust gas recirculation, complying with the aforementioned requirements. The recirculated exhaust gas is passed to the intake system and then to the combustion chamber through the conduit 118 under control of valve 119. When the choke 102 is operative (switch D in position d), the supply circuit of the valve 119 (normally closed) is opened. When, on the other hand, the choke 102 is not operative (switch D in position d'), the control circuit of the valve 119 is closed through the switch S (normally open) placed under the accelerator pedal and the switch T (normally closed) placed as the end of the latter's stroke. Therefore, when the vehicle is at idle or in the deceleration phase, i.e., with the accelerator pedal fully released, the switch S remains open and the valve 119 closed, while in the acceleration phase the pedal operates the switch S which brings about the opening of the valve 119, allowing the passage of the recirculation gas. When the end of the accelerator stroke is reached (throttle fully open), the switch T opens, interrupting the continuity of the supply circuit to the electric valve 119 and therefore preventing the recirculation of the exhaust gases.

It will be appreciated that the invention may be embodied in forms other than that specifically described. For example, the interruption of the electrical circuit controlling the operation by switch C may be effected by operations other than engaging a power transmitting gear of the gear-box. Thus, when the engine is turning at a speed in excess of idling speed, switch C may be moved from position c to position c'. This may be effected by a mechanical or other connection from the throttle plate 104, as indicated by the broken line 125, such that when the throttle plate 104 is at the idling position, the switch C is closed, and when the plate 104 is at a non-idling position, the switch C is opened. Alternatively, the switch C may be operated by signals from an engine speed monitor (not shown) of any known type. In this latter arrangement, the connection to the switch C shown by broken line 125 is from a tachometer (not shown) or other speed-responsive mechanism which causes the switch C to move from its closed position c when the engine speed is in the idling speed range to its open position c' when the engine speed exceeds idling speeds.

The operation of switch D may be dependent on the temperature of the reactor 115 rather than on the operative state of the choke 102. In this non-illustrated embodiment, a temperature monitor is provided at the reactor 115 and signals (suitably amplified, if necessary) representative of reactor temperature are applied to cause the switch D to move from position d to position d' when the reactor has attained its minimum working temperature (about 850°C for conventional thermal reactors). When the reactor temperature has fallen, the switch D reverts from position d' to position d. The construction and mode of operation of this non-illustrated embodiment will be clear to those skilled in the art.

Figure 3:
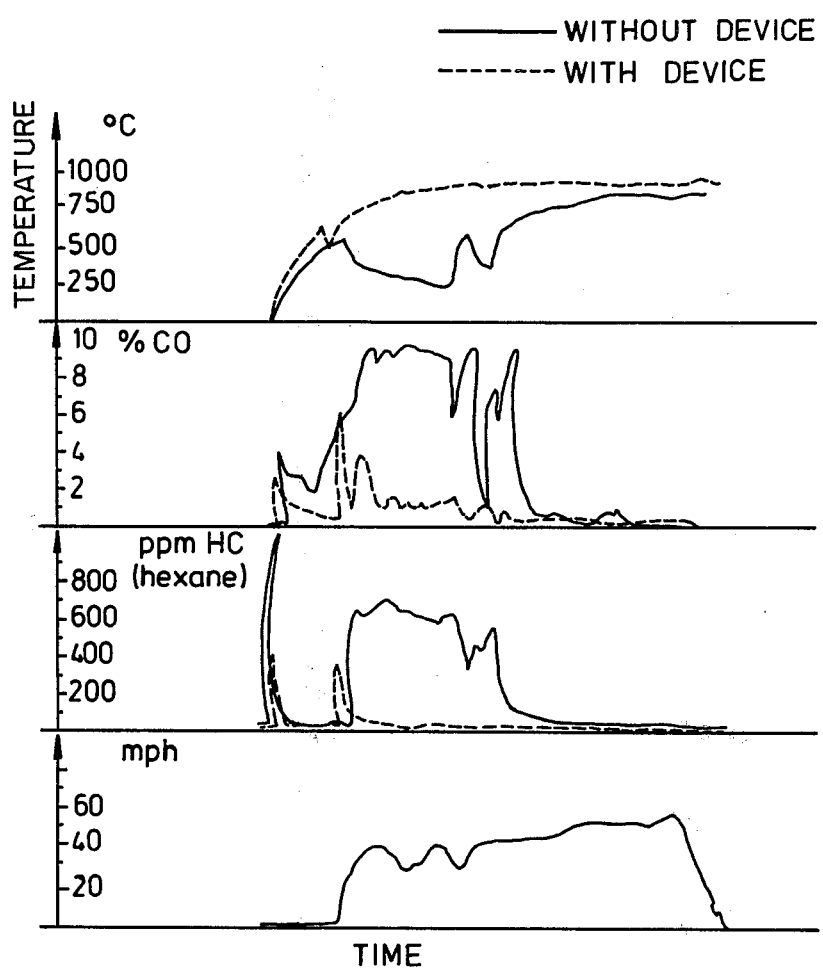
FIG. 3 shows graphically a comparison of the exhaust characteristics of engines with and without the system of the invention.

Reference is now directed to FIG. 3 which shows the results of tests performed on an automatic gear change European automobile having an engine capacity of about 1800 cc fitted with a thermal reactor and an exhaust gas recycle system.

The solid line curves show test results before the car was fitted with the system of the invention, and the broken line curves show the results obtained with the system of the invention.

The elapsed time is shown along the abscissa. The top curves show reactor temperature, and it is apparent that the reactor warm-up time is significantly reduced by the system of the invention, and the reactor was in fact effective in less than one minute. It will further be noted by comparison with the speed curve of the bottom graph that the reactor temperature varied more with speed in the case of the car not adapted with the system of the invention.

The two centre graphs, showing % CO and parts per million of unburned hydrocarbon (HC) in the exhaust gas, clearly highlight the considerable benefits of the invention.

The present invention has been described with particular reference to some specific embodiments, but it will be understood that variations and modifications may be made without departing from the invention as defined in the claims.

What we claim is:

1. A method of operating an automotive engine system having a carburetor for producing an air-fuel mixture, choke means for enriching the air-fuel mixture, an intake manifold for passing the air-fuel mixture to the engine, a throttle for regulating the passage of the air-fuel mixture to the engine, a spark ignition system for igniting air-fuel mixture in the engine, an exhaust system comprising an exhaust conduit and an exhaust gas purifying reactor; and means for recycling a part of the exhaust gas from the exhaust conduit to the engine, comprising the steps of: providing communication of the intake manifold pressure to a pressure responsive device which is operative on the timing of the spark ignition system when said choke means is operative and the engine system is in at least one of the following predetermined operating conditions comprising idling, low load, and said reactor having a temperature below its minimum effective working temperature, for exerting a retarding action on the ignition spark timing of said spark ignition system in accordance with the communicated intake manifold pressure by means of said pressure responsive device; interrupting the communication of the intake manifold pressure with said pressure responsive device when the engine is in at least one of the following conditions comprising said choke means being inoperative, the engine system operating mode being at a speed exceeding idling, the engine system operating mode being at a load exceeding low load, and the reactor temperature being at least at its minimum effective working temperature; recirculating said exhaust gas when the engine is in at least one of the following conditions comprising said choke means being inoperative, the engine system operating mode being a driving mode, the engine system operating mode being at a load exceeding low load, and the reactor being at least at its minimum effective working temperature; and interrupting the recirculation of said exhaust gas when the engine is in at least one of the following conditions comprising said choke means being operative, the engine system operating mode being substantially at an extreme load condition, the engine system operating mode being substantially at an extreme speed condition, and the reactor temperature being below its minimum effective working temperature.

2. The method according to claim 1 wherein said minimum temperature is 850°C.

3. The method according to claim 1 including the step of obtaining a signal representative of a predetermined engine condition whereupon recirculation of said exhaust gas is enabled, said signal being derived in response to and when one of the following conditions of said engine system is present which comprise:
 a. the engagement of the engine with a power transmission gear;
 b. when said engine is at speeds between idling and maximum speeds;
 c. when said throttle is located at positions between idle load and high load; and
 d. said reactor temperature at least equal to its minimum effective working temperature.

4. An automotive engine system comprising, in combination: an automotive engine, an intake system comprising a carburetor system for forming an air-fuel mixture, and an intake manifold for conducting the air-fuel mixture from said carburetor system to said engine, choke means operative for enriching the air-fuel mixture, throttle means for regulating the amount of air-fuel mixture passed to said engine, an exhaust gas conduit, an exhaust gas recycle conduit connected between said exhaust gas conduit and said intake system, first valve means for preventing recycling of said exhaust gas through said recycle conduit, an exhaust gas purifying reactor for purifying exhaust gas discharged from said exhaust conduit to the surrounding atmosphere, a spark ignition system for igniting the air-fuel mixture in the engine, pressure responsive means in operable communication with said intake manifold for sensing the pressure at the inlet to said intake manifold and connected by means to said spark ignition system for varying the timing of the spark from the spark ignition system, second valve means for interrupting communication between said pressure responsive device and said intake manifold, means responsive to one of a plurality of first predetermined engine system conditions for operating said first and second valve means such that said first valve means prevents recycling of said exhaust gas through said recycle conduit when said engine is in at least one of said engine system conditions comprising said choke means being operative; said engine system mode being substantially at an extreme idling or high load condition; the temperature of said reactor being below its minimum effective working temperature; and said first valve means is inoperable to prevent recycling of said exhaust gas through said recycle conduit during other operating conditions of said engine system, and said second valve means permitting communication between said pressure responsive device and said intake manifold when said choke means is operative and said engine system mode comprises at least one of the following second conditions comprising an idling mode; a low load mode; and said reactor having a temperature below its minimum effective working temperature, and said second valve means interrupting communication between said pressure responsive means and said intake manifold during other engine operating conditions.

5. The system according to claim 4 wherein said first valve means is in a normally closed position and is opened on completion of an electrical circuit in said engine system which corresponds to at least one of said engine operating conditions.

6. The system according to claim 4 wherein said second valve means is normally closed and is opened on completion of an electrical circuit in said engine system which corresponds to at least one of said second engine operating conditions.

7. The system according to claim 4 wherein said pressure responsive means senses said pressure at a location downstream of said throttle means.

8. The system according to claim 4 wherein said minimum temperature is 850°C.

* * * * *